(12) United States Patent
Bellini et al.

(10) Patent No.: US 11,639,276 B2
(45) Date of Patent: May 2, 2023

(54) TRANSFER STAR-WHEEL FOR CONTAINERS OF THERMOPLASTIC MATERIAL

(71) Applicant: GEA PROCOMAC S.P.A., Sala Baganza (IT)

(72) Inventors: Vittorio Bellini, San Secondo Parmense (IT); Davide Coloretti, Sala Baganza (IT)

(73) Assignee: GEA PROCOMAC S.P.A., Sala Baganza (IT)

( * ) Notice: Subject to any disclaimer, the term of this patent is extended or adjusted under 35 U.S.C. 154(b) by 57 days.

(21) Appl. No.: 17/294,856

(22) PCT Filed: Sep. 13, 2019

(86) PCT No.: PCT/IB2019/057737
§ 371 (c)(1),
(2) Date: May 18, 2021

(87) PCT Pub. No.: WO2020/109878
PCT Pub. Date: Jun. 4, 2020

(65) Prior Publication Data
US 2022/0024704 A1 Jan. 27, 2022

(30) Foreign Application Priority Data
Nov. 28, 2018 (IT) .......... 102018000010659

(51) Int. Cl.
*B65G 47/86* (2006.01)
(52) U.S. Cl.
CPC .... *B65G 47/847* (2013.01); *B65G 2201/0244* (2013.01)

(58) Field of Classification Search
CPC .............. B65G 47/847; B65G 2201/0244
See application file for complete search history.

(56) References Cited

U.S. PATENT DOCUMENTS 8,960,656 B2 2/2015 Baumgarte et al.
9,415,951 B2 * 8/2016 Fahldieck .............. B08B 9/426
(Continued)

FOREIGN PATENT DOCUMENTS

EP 1914181 B1 * 4/2009 ............. B65G 33/02
EP 2493674 A2 5/2012
JP 2011026099 A 10/2011

*Primary Examiner* — Gene O Crawford
*Assistant Examiner* — Lester Ill Rushin
(74) *Attorney, Agent, or Firm* — Pearne & Gordon LLP; Bryan M. Gallo

(57) ABSTRACT

Transfer star-wheel (1) for containers (100) of thermoplastic material, comprising:
a rotary carousel (2) bearing a plurality of supporting stations (S) for supporting containers (100) by their neck (100*b*), in each supporting station (S) being provided a pliers (3) hinged to the rotary carousel (2) at a hinge axis (AA) in such a way that it assumes at least a first configuration in which the pliers (3) is fixed, that means it cannot rotate about its hinge axis (AA), and a second configuration in which the pliers (3) can oscillate about its hinge axis (AA);
a cam kinematic motion that is operatively active on each pliers (3) for maintaining it in the first configuration, characterized in that it comprises a reactivating device (8) for each pliers (3), that comprises elastic means (9, 10) operatively active on the pliers (3) to bring it from the second to the first configuration following an accidental event that deactivated the pliers.

8 Claims, 7 Drawing Sheets

(56) References Cited

U.S. PATENT DOCUMENTS

| | | | |
|---|---|---|---|
| 9,527,616 B2 * | 12/2016 | Fahldieck | ............... B65B 43/60 |
| 2005/0011730 A1 | 1/2005 | Wittmann et al. | |
| 2012/0223468 A1 * | 9/2012 | Baumgarte | ......... B29C 49/4205 |
| | | | 269/55 |
| 2015/0091316 A1 * | 4/2015 | Fahldieck | ............ B65G 47/847 |
| | | | 294/99.1 |

* cited by examiner

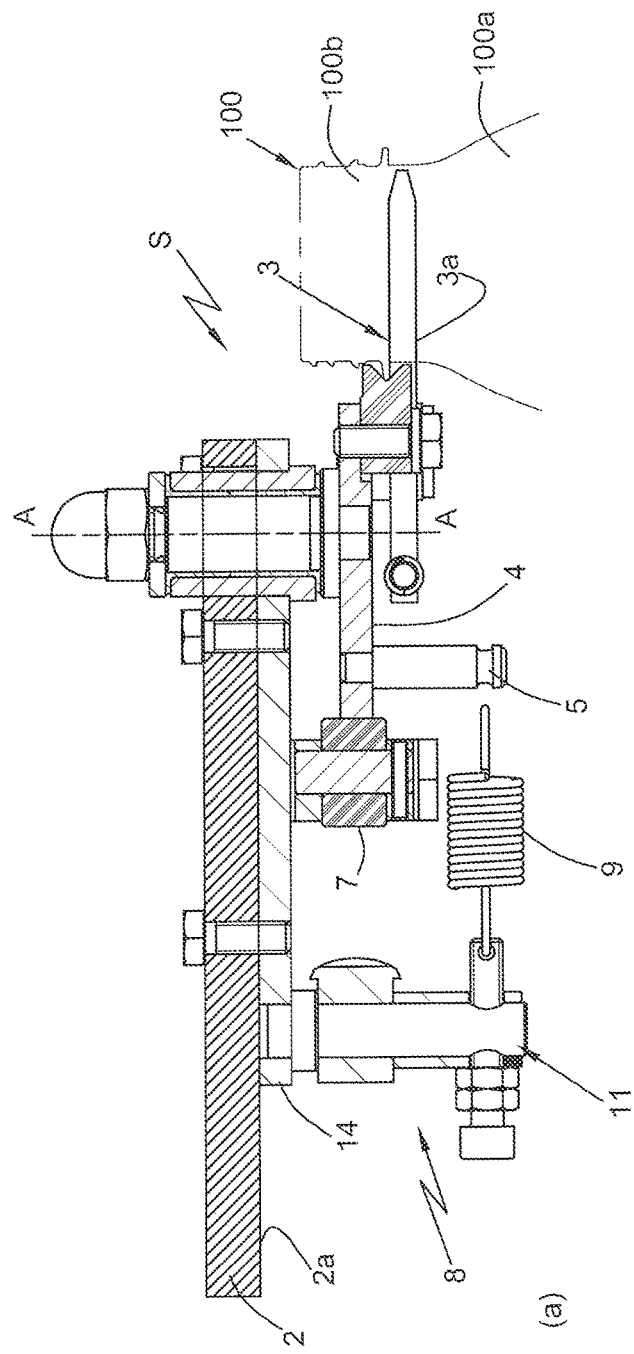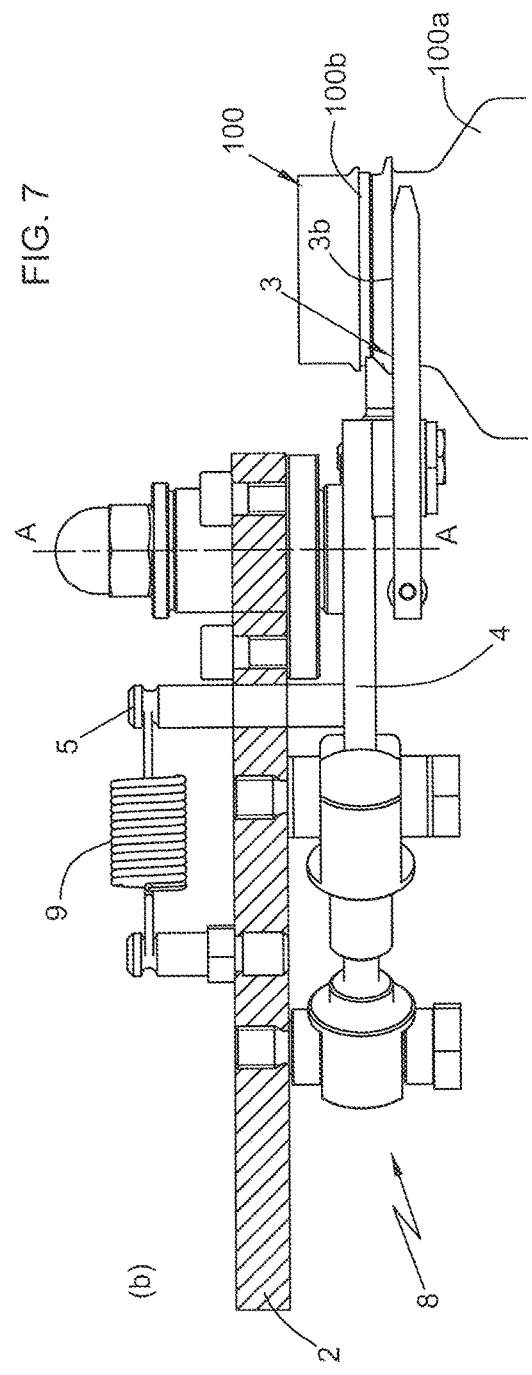
FIG. 7

TRANSFER STAR-WHEEL FOR CONTAINERS OF THERMOPLASTIC MATERIAL

TECHNICAL FIELD

The present invention relates to a transfer star-wheel for containers of thermoplastic material, in particular for use in the bottling industry.

As is known, a bottling line is formed by several operational units that perform the same number of machining operations on a container, such as sterilization, forming, filling and capping.

In this context, attention is directed to the transfer star-wheels of the containers placed between one unit and the other.

BACKGROUND ART

Each transfer star-wheel comprises a rotary carousel with equispaced compartments formed at its outer circumference. Each compartment receives the neck of one of the containers, supporting it by means of a pliers.

To avoid jamming due to the slowdown of the operating unit downstream, so-called "collapsible" pliers are already known, which are releasable from their fixed position so as to oscillate about a hinge axis.

The oscillation can take place in one direction or in two directions, as described in US 2005/0011730.

Once the cause of the jamming has been eliminated, the pliers must be manually returned to its original configuration.

From document JP 2011 026099 A it is known a gripper conveyance apparatus that has an openable and closable gripper portion which is attached to a moving conveyance body through an arm and grips a preform which is a cylindrical body. The grip portion is rotatably mounted on the arm through a shaft perpendicular to an opening and closing plane, and a rotation regulating means which allows rotation by overload on the shaft and retention of a rotation displacement state, so that the rotation regulating means allows the gripper portion to rotate relative to the shaft perpendicular to the opening and closing plane rotation for avoidance of damage due to overload and thus retention of the displacement state so as not to return, thereby grasping generation displacement due to overload. Thus, damage to another position by automatic return as well as continuance of conveyance without noticing an abnormal product is prevented.

In this context, the technical task underpinning the present invention is to provide a transfer star-wheel for containers of thermoplastic material that obviates the drawbacks of the prior art mentioned above.

DISCLOSURE OF THE INVENTION

In particular, an object of the present invention is to provide a transfer star-wheel for containers of thermoplastic material which is more flexible in responding to slowdown situations and the subsequent resumption of the advancement of the containers.

Another object of the present invention is to propose a transfer star-wheel for containers of thermoplastic material, in which the intervention of the operator following jamming is further reduced compared to the known solutions.

The defined technical task and the specified objects are substantially achieved by a transfer star-wheel for containers of thermoplastic material, comprising:

a rotary carousel bearing a plurality of supporting stations for supporting the containers by their neck, in each supporting station being provided a pliers hinged to the rotary carousel at a hinge axis in such a way that it assumes at least a first configuration in which the pliers is fixed, that means it cannot rotate about its hinge axis, and a second configuration in which the pliers can oscillate about its hinge axis;

a cam kinematic motion that is operatively active on each pliers for maintaining it in the first configuration, characterized in that it comprises a reactivating device for each pliers, that comprises elastic means operatively active on the pliers to bring it from the second to the first configuration following an accidental event that deactivated the pliers.

In particular, each pliers comprises:

two jaws;

a plate to which the jaws are integrally fixed, said plate being hinged to the rotary carousel at the hinge axis of the pliers.

Preferably, the cam kinematic motion comprises a roller coupled to a perimeter recess of the plate in such a way that the roller can slide in the perimeter recess. In particular, the perimeter recess is a curvilinear recess obtained on the edge of the plate.

In accordance with a first embodiment, the plate is provided with a pin. The reactivating device comprises a further pin and an articulated arm that connects the further pin to the cam kinematic motion. The elastic means comprises a first spring interposed between the pin and the further pin in such a way as to elastically couple them and a second spring in preloaded position on the articulated arm.

Preferably, each supporting station comprises a further plate fixed to the rotary carousel. The plate, the cam kinematic motion and the reactivating device are fixed to the further plate.

Preferably, the further plate is fixed to a lower surface of the rotary carousel. In accordance with a second embodiment, the plate is provided with a pin that is slidably engaged in a corresponding arched opening obtained in the rotary carousel.

For example, the arched opening is a through-hole or a blind hole.

In this second embodiment, part of the reactivating device extends above the rotary carousel and part of the reactivating device extend below the rotary carousel.

In all the embodiments, the reactivating device is interposed between the pin and the cam kinematic motion.

BRIEF DESCRIPTION OF DRAWINGS

Further characteristics and advantages of the present invention will become more apparent from the following indicative and therefore non-limiting description of a transfer star-wheel for containers of thermoplastic material, as illustrated in the appended drawings in which:

FIGS. 7a and 7b show, respectively, the first and second embodiment of the supporting station, in sectional side view.

DETAILED DESCRIPTION OF PREFERRED EMBODIMENTS OF THE INVENTION

Figure 1:
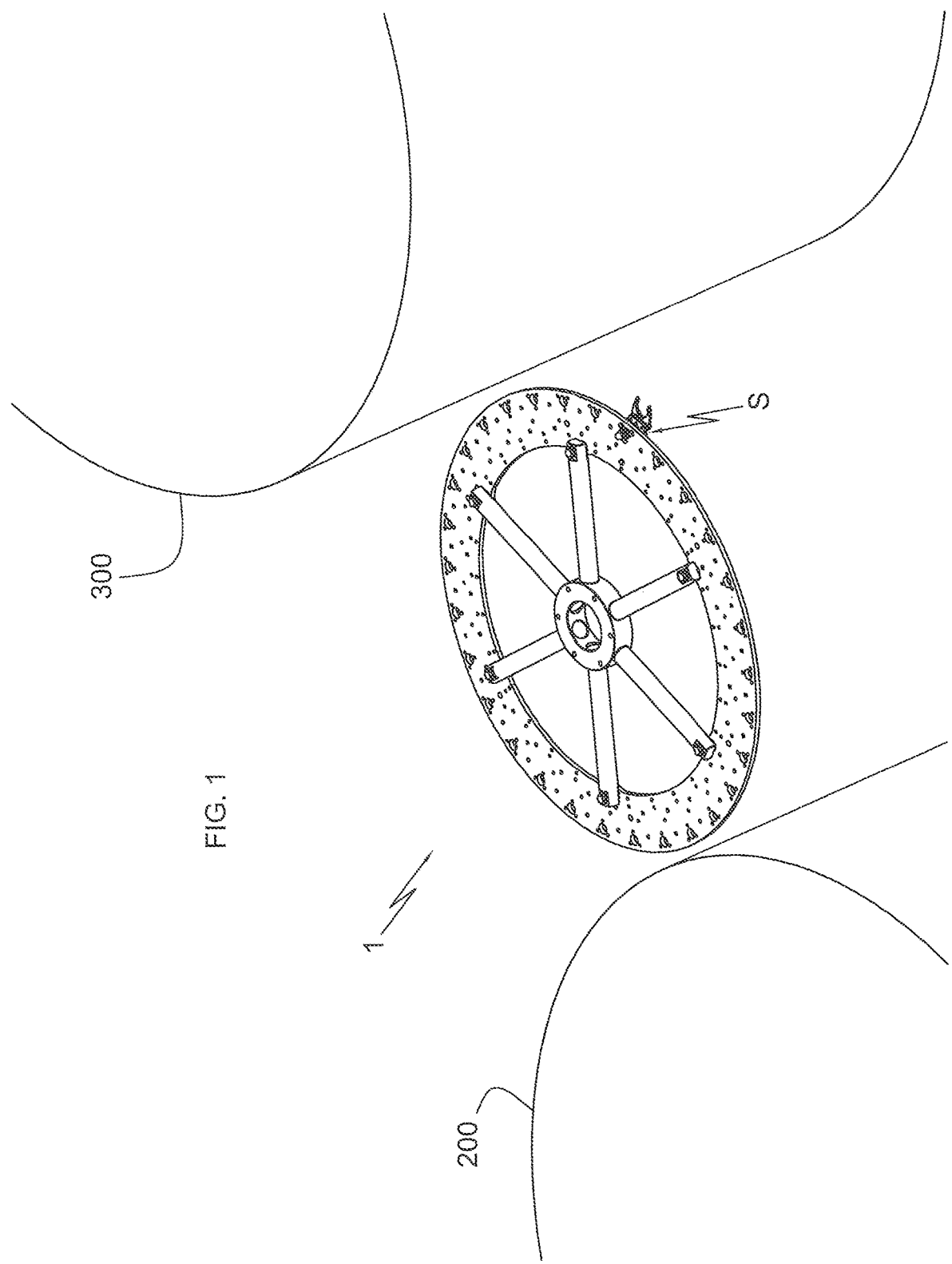
FIG. 1 shows a transfer star-wheel for containers of thermoplastic material, according to the present invention, seen from above.

With reference to the figures, the number 1 indicates a transfer star-wheel for containers 100 of thermoplastic material, for example PET.

In particular, in this context the term "container" can be considered a preform of thermoplastic material or a formed container, which has a tubular body 100a and a threaded neck 100b.

For example, the transfer star-wheel 1 is interposed between a forming unit 200 and a sterilizing unit 300 of the containers 100.

The transfer star-wheel 1 comprises a rotary carousel 2 bearing a plurality of supporting stations S for supporting the containers 100 by their neck 100b.

In each supporting station S a pliers 3 is provided, which is hinged to the rotary carousel 2 at a hinge axis AA so as to assume at least:

a first configuration in which the pliers 3 is fixed, that means it cannot rotate about its hinge axis AA, and a second configuration in which the pliers 3 can oscillate about its hinge axis AA, that means the pliers 3 is neutral with respect to said hinge axis AA.

Thus, each pliers 3 is rotatably hinged to the rotary carousel 2 at its hinge axis AA.

As can be seen from the figures, each pliers 3 comprises two jaws 3a, 3b elastically coupled, and a plate 4 to which the jaws 3a, 3b are integrally fixed. In particular, the plate 4 is hinged to the rotary carousel 2 at the hinge axis AA. Each pliers 3 is maintained in the first configuration by a cam kinematic motion. Preferably, the cam kinematic motion comprises a roller 7 coupled to a perimeter recess 4a of the plate 4 in such a way that the roller 7 can slide in the perimeter recess 4a.

In particular, the plate 4 of each pliers 3 has a substantially disc-like shape and the perimeter recess 4a is a curvilinear recess obtained on the outer perimeter area of the plate 4.

When a jamming occurs downstream of the transfer star-wheel 1, or more in general a slowdown, the pliers 3 is uncoupled, that means it passes from the first configuration in which it is fixed to the second configuration in which it can oscillate with respect to the hinge axis AA. In particular, following the jamming, the plate 4 begins to rotate about the hinge axis AA so that its perimeter recess 4a slides on the roller 7.

Advantageously, for each pliers 3 a reactivating device 8 is present which comprises elastic means 9, 10 operatively active on the pliers 3 to bring it from the second to the first configuration. The reactivating device 8 then intervenes following the removal of the jamming downstream of the transfer star-wheel 1 or following the resumption of the advancement of the containers 100.

Figure 2:
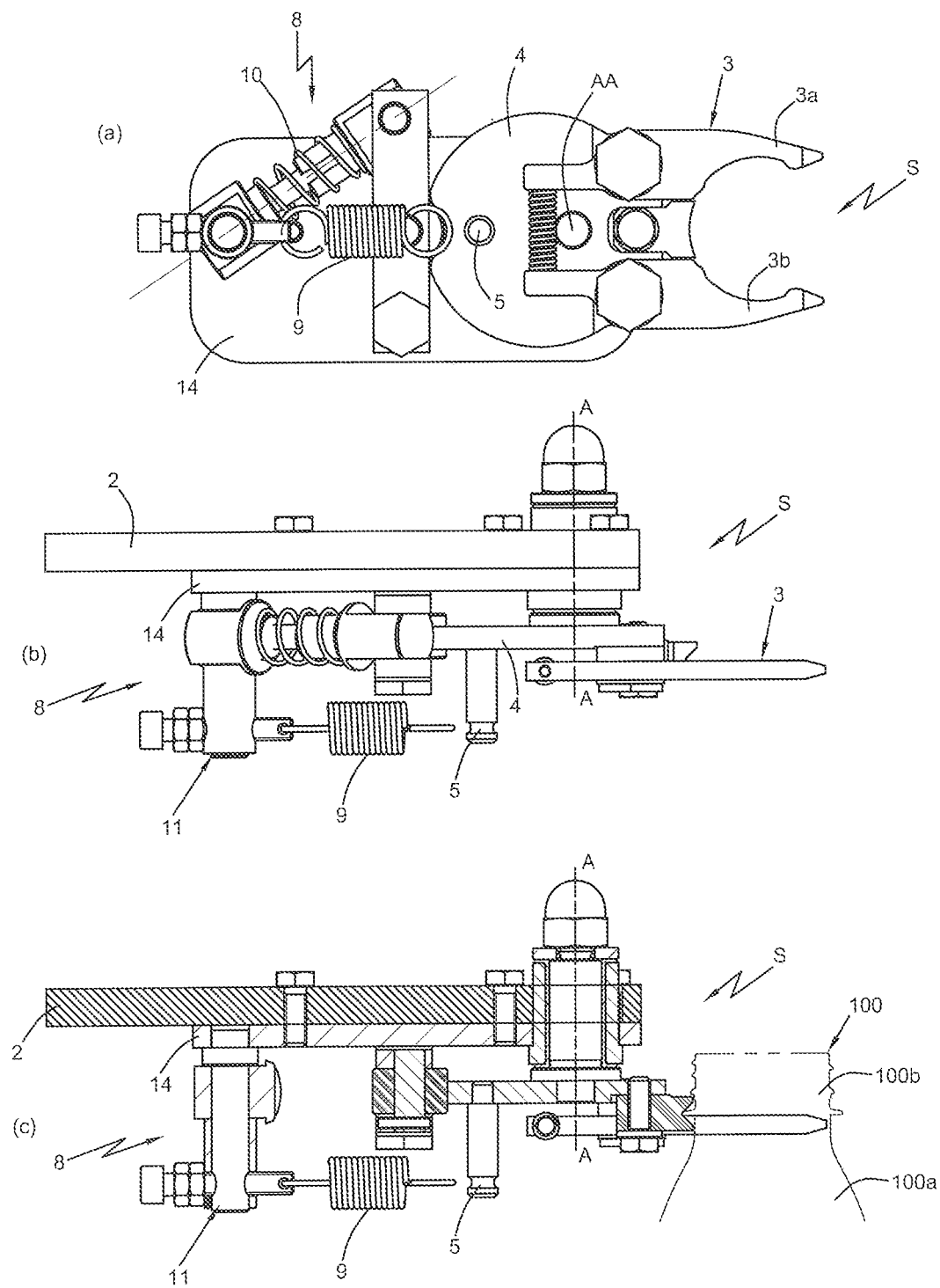
FIGS. 2a, 2b and 2c show a first embodiment of a supporting station of the transfer star-wheel of FIG. 1, respectively in bottom view, side view and sectional side view.
Figure 3:
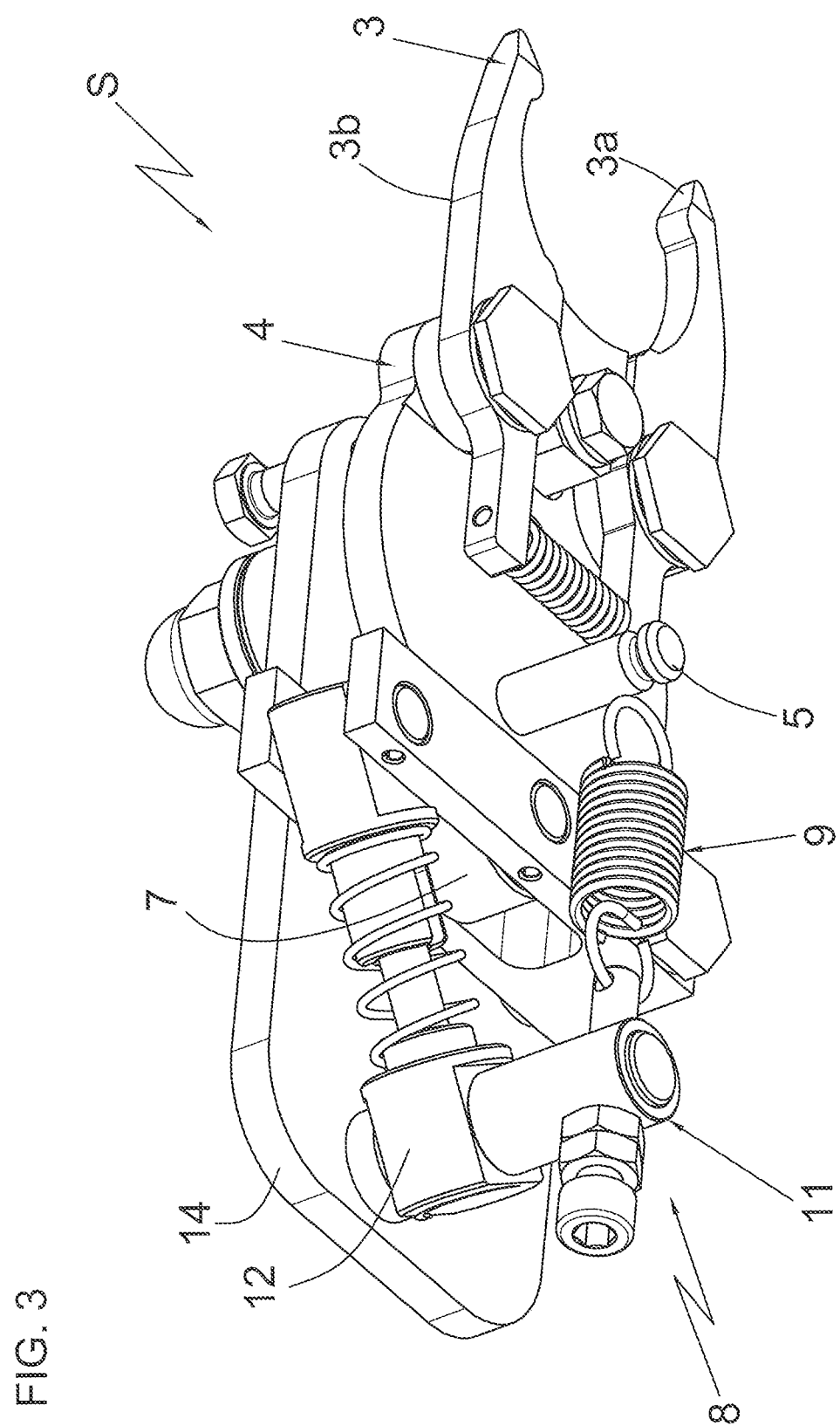
FIG. 3 shows the supporting station of FIGS. 2a-2c, in perspective view from below.

In accordance with a first embodiment illustrated in FIGS. 2a-2c, 3 and 7a, the plate 4 is provided with a pin 5 and the reactivating device 8 comprises a further pin 11, integrally fixed to the rotary carousel 2.

The reactivating device 8 comprises elastic means 9, 10 consisting of:

a first spring 9 interposed between the pin 5 and the further pin 11 in such a way as to elastically couple them;

a second spring 10 in preloaded position on an articulated arm 12 which connects the further pin 11 to the cam kinematic motion.

In particular, the reactivating device 8 is interposed between the pin 5 of the plate 4 and the cam kinematic motion.

Figure 4:
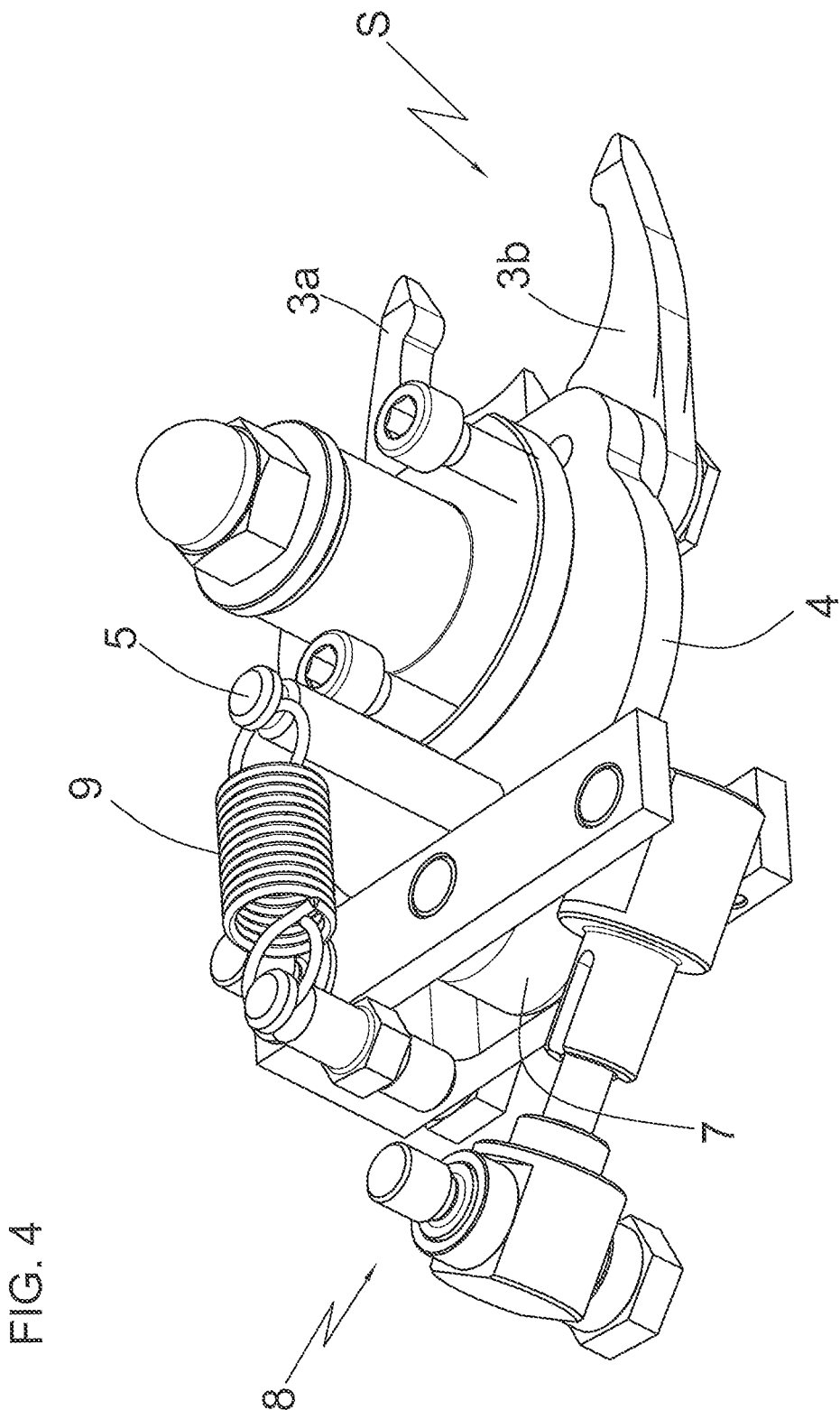
FIG. 4 shows a second embodiment of the supporting station of FIG. 3.
Figure 5:
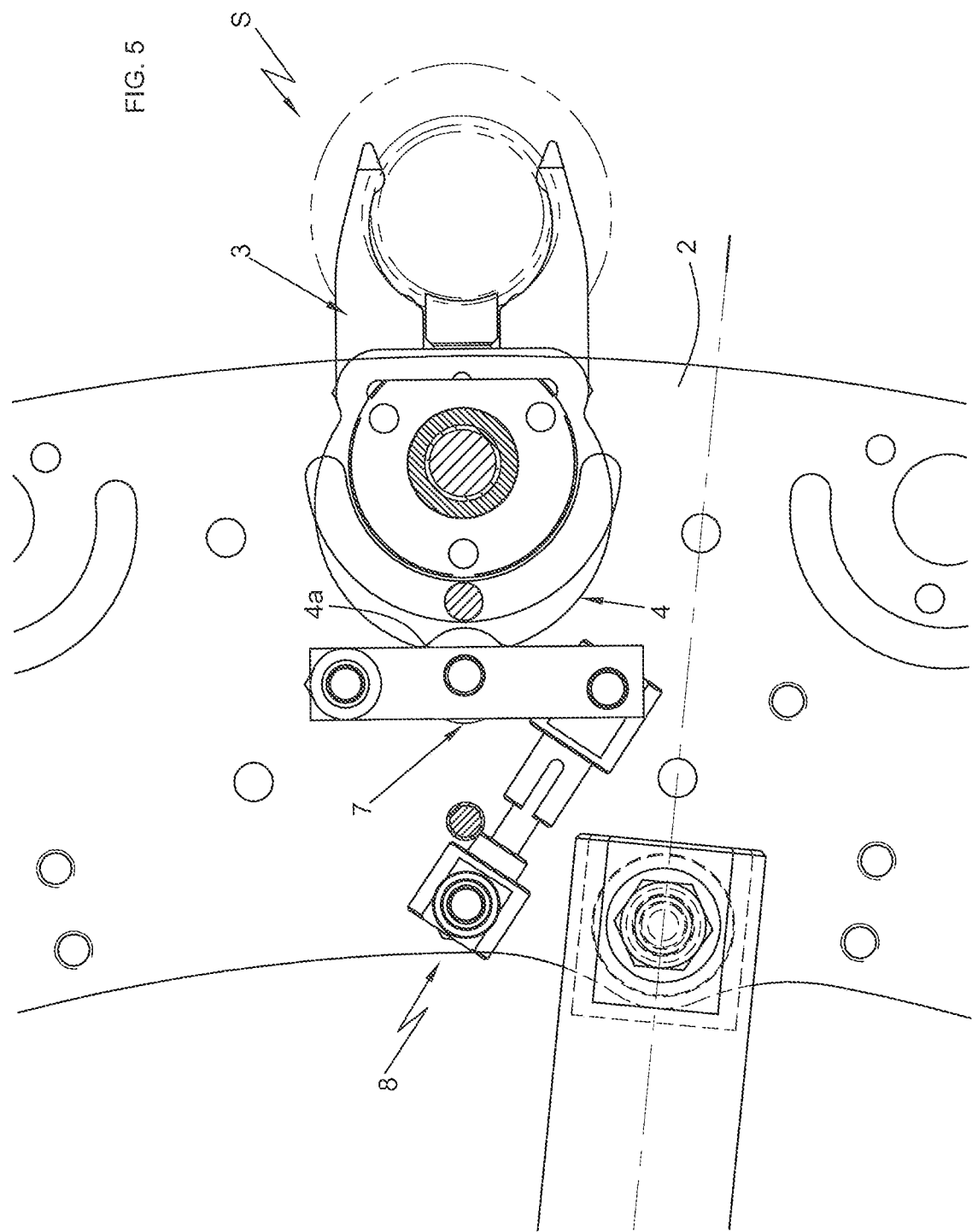
FIGS. 5-6 show the supporting station of FIG. 4 mounted on the rotary carousel of the transfer star-wheel, respectively seen from below and from above.
Figure 6:
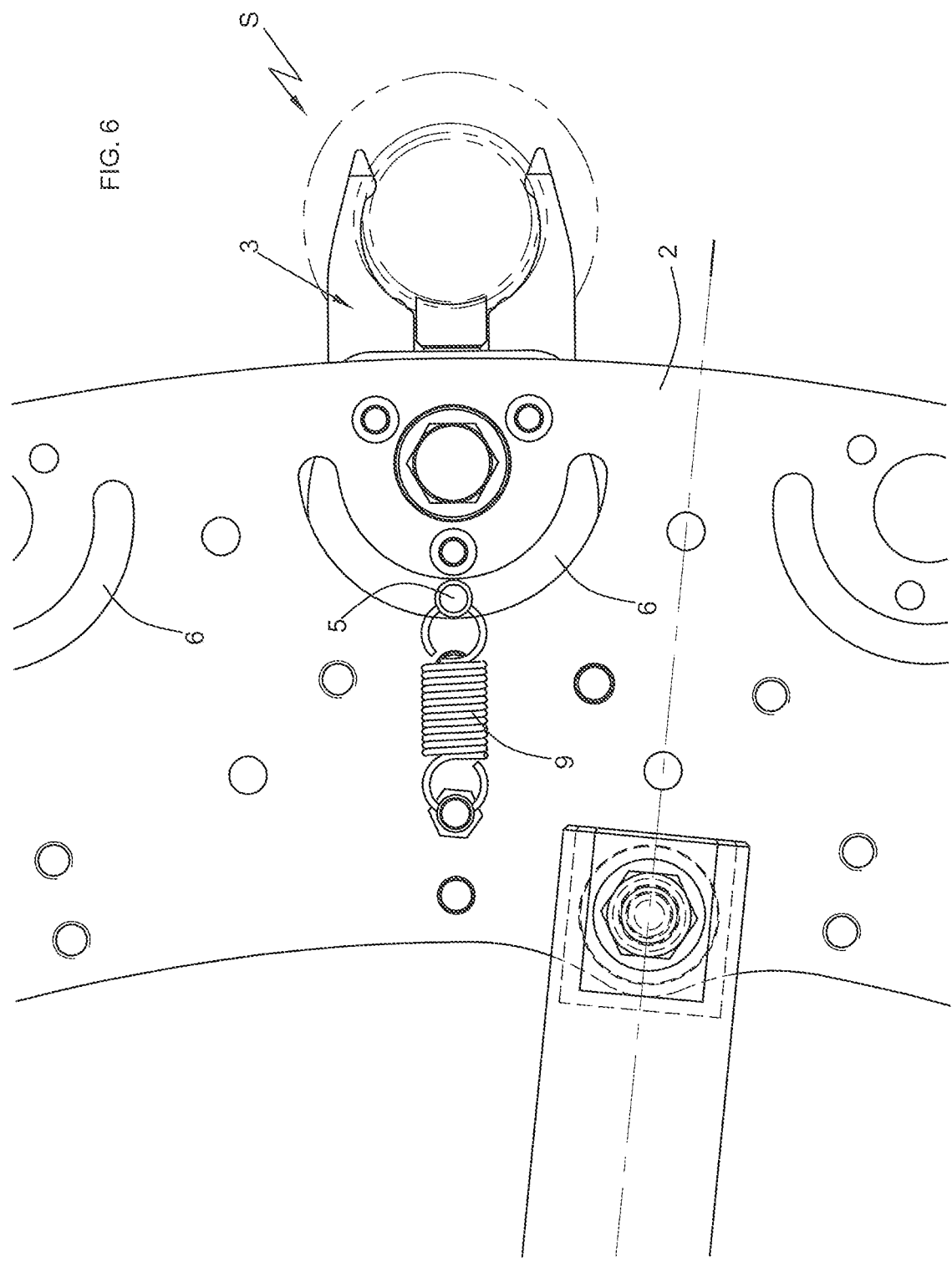

In accordance with a second embodiment illustrated in FIGS. 4, 5, 6 and 7b, the plate 4 is provided with a pin 5 that is slidably engaged in an arched opening 6 obtained in the rotary carousel 2.

As many arched openings 6 are obtained in the rotary carousel 2 as there are supporting stations S (and therefore pins 5).

Preferably, each arched opening 6 is a through-hole. Alternatively, the arched opening 6 can be a blind hole.

When a jamming occurs downstream of the transfer star-wheel 1, or more in general a slowdown, the pliers 3 is uncoupled, that means it passes from the first configuration in which it is fixed to the second configuration in which it can oscillate with respect to the hinge axis AA. In particular, following the jamming, the plate 4 begins to rotate about the hinge axis AA so that its perimeter recess 4a slides on the roller 7.

The pin 5 of the plate 4, in turn, slides into the corresponding arched opening 6 of the rotary carousel 2.

FIGS. 7a-7b show the differences between the first and the second embodiment. In particular:

in the first embodiment illustrated in FIG. 7a, the supporting station S comprises a further plate 14 having one side fixed to the rotary carousel 2 and the other bearing the plate 4 with the pliers 3, the cam kinematic motion and the reactivating device 8;

in the second embodiment illustrated in FIG. 7b, the pin 5 of the plate 4 crosses the rotary carousel 2 at the arched opening 6. In this way, part of the reactivating device 8 extend below the rotary carousel 2 and part of the reactivating device 8 extend above the rotary carousel 2.

Preferably, in the first embodiment, the further plate 14 is fixed to a lower surface 2a of the rotary carousel 2.

The first embodiment is more compact than the second embodiment and structurally simpler because all the elements of the supporting station S are located on one side (underneath) of the rotary carousel 2.

In the second embodiment, however, some components of the reactivating device 8 extend above the rotary carousel 2 and other components extend below the rotary carousel 2.

From the description given, the features of the transfer star-wheel for containers of thermoplastic material according to the present invention appear clear, as do the advantages thereof.

In particular, when jamming or slowdowns occur, the pliers can uncouple from its fixed position, and then be automatically returned to such a position when the cause of the jamming/slowdown has been eliminated. This is ensured by the reactivating device proposed herein.

The invention claimed is:

1. Transfer star-wheel for containers of thermoplastic material, comprising:

a rotary carousel bearing a plurality of supporting stations for supporting the containers by their neck, each supporting station being provided with pliers hinged to the rotary carousel at a hinge axis so that the pliers assumes at least a first configuration in which the pliers is fixed, that means it cannot rotate about the hinge axis, and a second configuration in which the pliers can oscillate about the hinge axis, each pliers comprising two jaws and a plate to which said jaws are integrally fixed, said plate being hinged to the rotary carousel at said hinge axis;

a cam kinematic motion that is operatively active on each pliers for maintaining the pliers in the first configuration, wherein said cam kinematic motion comprises a roller coupled to a perimeter recess of said plate whereby said roller can slide on said perimeter recess;

a reactivating device for each pliers, that comprises elastic means operatively active on the pliers to bring the pliers from the second to the first configuration following an accidental event that deactivated the pliers, wherein said perimeter recess is a curvilinear recess obtained on the edge of said plate.

2. The transfer star-wheel according to claim 1, wherein said plate is provided with a pin, said reactivating device comprising a further pin and an articulated arm that connects the further pin to the cam kinematic motion, said elastic means comprising a first spring interposed between said pin and said further pin to elastically couple said pin and further pin to a second spring in a preloaded position on the articulated arm.

3. The transfer star-wheel according to claim 2, wherein each supporting station comprises a further plate fixed to the rotary carousel, said plate, said cam kinematic motion and said reactivating device being fixed to said further plate.

4. The transfer star-wheel according to claim 2, wherein said further plate is fixed to a lower surface of the rotary carousel.

5. The transfer star-wheel according to claim 2, wherein said plate is provided with a pin that is slidably arranged in a corresponding arched opening obtained in said rotary carousel.

6. The transfer star-wheel according to claim 5, wherein said arched opening is a through-hole or a blind hole.

7. The transfer star-wheel according to claim 5, wherein part of said reactivating device extends above the rotary carousel and part of said reactivating device extends below said rotary carousel.

8. The transfer star-wheel according to claim 2, wherein said reactivating device is interposed between said pin and said cam kinematic motion.

* * * * *